United States Patent [19]

Lehnhardt et al.

[11] 4,409,248
[45] Oct. 11, 1983

[54] HEAT-GELLING AND FOAM-STABILIZING ENZYMATICALLY MODIFIED VEGETABLE ISOLATES

[75] Inventors: William F. Lehnhardt; Frank T. Orthoefer, both of Decatur, Ill.

[73] Assignee: A. E. Staley Manufacturing Company, Decatur, Ill.

[21] Appl. No.: 291,671

[22] Filed: Aug. 10, 1981

[51] Int. Cl.$^3$ .......................... A23J 3/00; A23J 3/02
    C12P 21/06
[52] U.S. Cl. ........................................ 426/46; 426/52;
    426/564; 426/573; 426/656; 435/69; 260/123.5
[58] Field of Search ...................... 426/7, 46, 656, 52, 426/564, 573; 435/69, 219; 260/123.5

[56] References Cited

U.S. PATENT DOCUMENTS

| | | | |
|---|---|---|---|
| 2,451,659 | 10/1948 | Calvert | 260/112 |
| 2,479,481 | 8/1949 | Eberl et al. | 260/112 |
| 2,489,208 | 11/1949 | Turner | 435/69 X |
| 2,502,029 | 3/1950 | Sair et al. | 435/69 X |
| 2,502,482 | 4/1950 | Sair et al. | 435/69 X |
| 3,303,182 | 2/1967 | Sakai et al. | 260/123.5 |
| 3,579,496 | 5/1971 | Martinez et al. | 260/123.5 |
| 3,630,753 | 12/1971 | Melnychyn | 99/17 |
| 3,734,901 | 5/1973 | Hayes et al. | 260/123.5 |
| 3,814,816 | 6/1974 | Gunther | 426/46 |
| 3,878,232 | 4/1975 | Hayes et al. | 260/412.4 |
| 3,932,672 | 1/1976 | Pour-El et al. | 435/69 X |
| 4,131,607 | 12/1978 | Petit et al. | 260/123.5 |
| 4,172,828 | 10/1979 | Davidson et al. | 260/123.5 |
| 4,188,399 | 2/1980 | Shemer | 426/276 |

FOREIGN PATENT DOCUMENTS 1377392 12/1974 United Kingdom .

OTHER PUBLICATIONS

Handbook of Food Additives, CRC, 2nd Ed., 1972, pp. 661–674 and 744–754.
Soybeans As A Food Source, CRC Press, Cleveland, Ohio, (1971).
Eldridge et al.–Purification of the 11S Component of Soybean Protein—Cereal Chem., vol. 44, Nov. 1967, pp. 645–652.
Briggs et al.—An Electrophoretic Analysis of Soybean Protein—Cereal Chem., vol. 27, May 1950, pp. 243–257.
Wolf et al.—Purification and Characterization of the 11S Component of Soybean Proteins—Archieves of Biochem. & Biophys., 85, 186–199, (1959).
Puski et al.—Modification of Functional Properties of Soy Proteins By Proteolytic Enzyme Treatment—Cereal Chem., vol. 52, pp. 655–665, (1975).
Smith et al.—Peptization of Soybean Proteins, The Effect of Neutral Salts on The Quality of Nitrogenous Constituents Extracted From Oil–Free Meal—JAOCS, vol. 60, Jun. 1938, pp. 1316–1320.
Nielson—The Composition of the Difficulty Extractable Soybean Phosphatides—JAOCS, vol. 37, 1960, pp. 217–219.

Primary Examiner—Robert A. Yoncoskie
Attorney, Agent, or Firm—M. Paul Hendricksen; Charles J. Meyerson

[57] ABSTRACT

By enzymatically modifying vegetable glycoprotein isolates with an acid proteinase such as pepsin, the glycoproteins may be converted to a vegetable isolate useful as an egg albumin replacement or whip-stabilizing agent. The enzymatic modification partially hydrolyzes the glycoproteins and compositionally alters the glycoprotein subunit and aggregate structure. The enzymatic alteration produces a glycoprotein aggregate comprised of a plurality of subunits having saliently different physical and functional properties from that of the vegetable protein precursor source materials. The enzymatically modified vegetable isolates are capable of forming firm, white, opaque heat-set gels similar to those of egg albumin. The enzymatically modified glycoproteins are compatible with salt-containing recipes and functionally useful over a broad pH range.

42 Claims, No Drawings

HEAT-GELLING AND FOAM-STABILIZING ENZYMATICALLY MODIFIED VEGETABLE ISOLATES

BACKGROUND OF THE INVENTION

In the food industry materials such as egg whites, hydrolyzed milk proteins and soy albumin have been used as aerating agents and heat-setting binders. When properly whipped along with other aqueous foaming or whipping recipe ingredients, the aerating agents permit the ingestion and entrapment of gases therein to provide a foamed or aerated product. These aerating agents must necessarily ingest and entrap an acceptable gas volume within a reasonable whipping time.

A limited and select group of proteinaceous materials have the necessary prerequisital properties to be functionally useful as a whipping agent. In essence, the whipping agent affords the means for achieving an aerated aqueous dispersion comprised of a continuous, homogeneous external aqueous film phase of the water-soluble whipping agent which homogeneously encapsulates a discontinuous internal phase of minute gas bubbles. The water-soluble, film-forming whipping agent provides the means for homogeneously and uniformly ingesting the gas and maintaining the ingested gas uniformly throughout the foamed product. The whipping agent must also necessarily provide a recipe viscosity conducive to the ingestion of gas into the foamed system. The aqueous film-forming, water-retention, film-elongation, cohesiveness, elasticity, compatibility with other recipe additives, etc. properties affect the gas ingestion and entrainment properties of the recipe and contribute to its stabilization against syneresis, collapse and migration while imparting sufficient structural integrity and strength for maintaining its foamed or aerated character.

A particularly successful vegetative protein aerating agent is disclosed in U.S. Pat. No. 3,814,816 by R. C. Gunther. The Gunther vegetable protein aerating agent is typically prepared by initially hydrolyzing an oil-free vegetable protein isolate (preferably soya) with acid or alkali, followed by an enzymatic modification (pepsin) to produce the desired aerating agent.

The relative ability of a foamed product to effectively retain the volume of gas which was initially ingested and entrappd within its foamed structure is frequently referred to as "foam stability."

Comparative to the vegetable protein whipping agents, natural whipping agents (e.g. egg albumin or milk protein) are generally recognized as possessing superior foam stability.

Protein molecules are known to undergo complex association and disassociation and chemical interractions which can adversely affect the overall stability of the aerated product. To compensate against this instability, foam or whip stabilizers are frequently incorporated into the whipping recipe.

Whipping agent stabilizers conventionally used (typically at about 0.01% to about 20.0% by weight of whipping agent dry weight) to facilitate the ingestion and incorporation of gas into whippable compositions include the polyphosphorous acid and salt sequestrants (e.g. meta-, ortho-, pyro-, tri-, tetra-, penta-, hexa-, etc. phosphoric acids and their salts such as those mentioned in the Handbook of Food Additives, CRC, 2nd Edition, pages 661–674 and 744–754). Exemplary phosphorus containing sequestrants for proteins include the ammonium, alkaline earth (e.g. calcium, etc.) alkali (e.g. potassium, sodium, etc.) salts of phosphates and polyphosphates such as trisodium pyrophosphate (TSPP), sodium hexametaphosphate (SHMP), potassium triphosphate (KTP), trisodium phosphate (TSP), tripotassium pentaphosphate (TKPP), disodium phosphate (DSP), sodium tetrapolyphosphate (STPP), mixtures thereof and the like. Such whipping stabilizers improve the protein hydrolyzates dispersibility and solubility in high solids aqueous mediums, increase its water-bonding and gel formation properties, its whipping properties and form complexes with the protein to stabilize the whipped product against syneresis, gas migration and collapse. Other edible hydrophilic film-formers (e.g. gums and/or starches) in minor amounts (e.g. less than 5 parts by weight), such as dextrin, carboxymethyl cellulose, hydroxypropyl cellulose, hydroxyethyl cellulose, alginates, carrageenin, xanthane, pectinates, polyvinylpyrrolidone, gelatin, pregelled starches (e.g. corn starch, potato starch, waxy maize starch, inhibited starches, high-amylose starches) are often utilized to improve upon the whipping and stabilizing properties of whipping recipes.

The most commonly reported leguminous proteins (e.g. soy) are the 2S, 7S, 11S and 15S proteins. *Soybeans as a Food Source* (CRC Press, Cleveland, Ohio, 1971) reports that the 2S protein (8,000–21,500 M.W.) typically comprises approximately 22%, the 7S (110,000–210,000 M.W.) approximately 37%, the 11S (about 350,000 M.W.) about 31% and the 15S (about 600,000 M.W.) approximately 11% of the total weight of the protein composition of defatted soybean products.

The fractionation and isolation of soy proteins have been extensively reported. U.S. Pat. No. 4,172,828 by Davidson et al. discloses a multiple-staged isolate separation recovery process. The initial soy flake extraction is conducted at pH 6.2–6.8 and a protein fraction is obtained therefrom by cooling the extract. Another isolate fraction may be curded from the initial extract by adjusting the whey fraction to a pH 4.5. Two other soy isolate fractions may be obtained by heating the whey and precipitating an isolate therefrom at a pH 5.3. The remaining recoverable protein is cooled and curded from the whey at a pH 4.5.

A patent by Calvert (U.S. Pat. No. 2,451,659) discloses extracting a soy protein at a pH 4.2–4.8 in the presence of an enzyme inhibiting agent and an oxygen excluding or blanketing agent. A patent issued to Eberl et al., U.S. Pat. No. 2,479,481 discloses a method for producing a substantially undenatured vegetable isolate. According to the Eberl et al. patent, the protein extraction may be suitable conducted at a pH 6.0–9.0. An isolate is curded and recovered from the extract by a pH 4.3–4.9 adjustment with sulfur dioxide. U.S. Pat. No. 3,303,182 discloses an isolation process in which the soy solubles are extracted at a temperature in excess of 80° C. The heat extract is then rapidly cooled to below 5° C. with an isolate being curded therefrom by a pH 4.2–5.0 adjustment.

U.S. Pat. No. 4,188,399 by Shemer discloses a heat-coagulable soy protein product. According to Shemer, the water-soluble protein and carbohydrate constituents when aqueously extracted at a pH 5.1–5.9 in the presence of an antioxidant followed by a pH 4.5 adjustment with phosphoric acid will provide a viscous proteinaceous solution which contains more than 70% of the 7S soy protein fraction. This viscous solution is reportedly useful as a heat-coagulable binder for synthetic and natural meat applications.

British Patent Specification No. 1,377,392 discloses a process for preparing a dry, substantially undenatured, salt-containing soy protein composition. The British patentees report "precipitation of the isolate from aqueous extraction prepared from defatted soy meals in the presence of water-soluble sulfite, bisulfite or dithionate salt, preferably an alkali metal (including ammonium) salt."

A U.S. Pat. No. by Melnychyn (3,630,753) discloses a process for producing a freeze-dried isolate. The process is conducted in the presence of specific types of oxidizing or thiol bearing reagents which are capable of reacting with disulfide linkages at elevated temperatures with the extracted protein being precipitated at pH 4.5.

Other articles reporting means for the separating of the 7S or 11S components include "Purification of the 11S Component of Soybean Protein" by Eldridge et al. (Cereal Chem., Vol. 44, Nov. 1967, pages 645–652), "An Electrophoretic Analysis of Soybean Protein" by Briggs et al., (Cereal Chem., Vol. 27, May 1950, pages 243–257) and "Purification and Characterization of the 11S Component of Soybean Proteins" by Wolf et al., Archieves of Biochemistry and Biophysics, 85, 186–199 (1959).

Numerous other publications disclose enzymatic treatment of vegetable proteins. An early U.S. Pat. No. by John R. Turner (2,489,208) discloses a pepsin modified whipping agent component. An alkaline material such as sodium sulfite, sodium carbonate or sodium hydroxide is used to extract glycinin at a pH 6.4–6.8. The glycinin is then precipitated from the extract (e.g. pH 4.2–4.6) at its isoelectric pH in which sulfur dioxide may be utilized as the adjusting acid. The precipitated glycinin product is then modified with pepsin under temperature and pH conditions conducive to hydrolysis of protein. The glycinin is hydrolyzed with pepsin until its water-solubility is increased to 40–50%. Similarly, U.S. Pat. No. 2,502,482 by Sair et al. reports the enzymatic modification of glycinin with pepsin to produce an isolate wherein at least 60% by weight of the pepsin modified isolate is water-soluble at a pH 5.0.

Puski reports the enzymatic modifying of soy isolates (precipitated at pH 4.5) with *Aspergillus oryzae* in "Modification of Functional Properties of Soy Proteins by Proteolytic Enzyme Treatment" (Cereal Chem. 52, pages 655–665 (1975)). In this publication the author discloses that the enzyme treatment of soy isolate increased foam expansion but yielded unstable foams.

Several publications also report using saline solutions to extract soy proteins. A publication by A. K. Smith et al. (Jr. American Chemical Society, Vol. 60, June 1938, pages 1316–1320) reports the extraction of soybean meal with pH 6.7 water alone yields more protein extract than an aqueous extraction in the presence of neutral salts.

U.S. Pat. No. 4,131,607 by Petit discloses a two-stage alkaline extraction. The extraction is initially conducted in the presence of sodium sulphite and magnesium salt at a pH 7.0–8.5 which is then increased to a pH 10.0–10.5 to complete the extraction. The protein extracts are then precipitated or curded by adjusting the extract to a pH 4.5–5.5. A patent issued to Martinez et al. (U.S. Pat. No. 3,579,496) similarly discloses a multiple solvent extraction process.

Numerous publications report small amounts of salts will destroy the heat-gelling properties of certain soy isolates which limits their use to recipes essentially free from interfering salt levels.

DESCRIPTION OF THE INVENTION

According to the present invention, there is provided an enzymatically modified vegetable protein composition possessing improved heat-gelling properties, said composition comprising glycoprotein aggregates of an average molecular weight within the 200,000 to 300,000 molecular weight range, said aggregates consisting essentially of a plurality of glycoprotein subunits of an average molecular weight less than that of the glycoprotein subunit precursor source material for said enzymatically modified protein composition and an average electrophoretic migration value less than that of the subunit precursor source material for said composition, said composition being further characterized by forming a solid, opaque gel when a pH 5.75 aqueous solution which contains 15% composition (on a protein weight-/volume basis) and 0.1 M sodium chloride is heated at 85° C. for 15 minutes.

The enzymatic treatment compositionally and functionally alters the vegetable glycoprotein precursor source material. The glycoprotein subunits of the source material are partially hydrolyzed by the enzymatic treatment and restructured into a glycoprotein aggregate comprised of a plurality of enzymatically modified glycoprotein subunits. The aggregate subunit components have an average molecular weight less than the subunit source material for the aggregate. Depending upon the vegetable glycoprotein precursor source material, the enzymatically modified glycoprotein aggregates will have an average molecular weight (as determined by Gel Filtration Chromatography of Example 1) from 200,000 to 300,000 and most typically within the 250,000–280,000 range. Particularly effective heat-gelling and whip-stability for enzymatically modified 7S glycoproteins have been obtained with aggregates of an average molecular weight within the 250,000 to 280,000 M.W. range.

A particularly suitable glycoprotein precursor source material for preparing the enzymatically modified glycoprotein aggregate compositions of this invention is the 7S glycoproteins of leguminous plants and especially the 7S glycoprotein of soy proteins. The major soy 7S glycoproteins are comprised of $\alpha'$, $\alpha$ and $\beta$ subunits as defined by Thanh V. H. et al. (*Biochem. Acta.* 490 (1977) 370–384). Pursuant to the sodium dodecyl sulfate (SDS) gel electrophoresis of Example 1 herein, the $\alpha'$, $\alpha$ and $\beta$ subunits respectively have an average molecular weight of about 79,500, 72,000 and 48,500. By enzymatically treating such 7S glycoproteins, the glycoprotein subunits are incompletely hydrolyzed to yield an enzymatically modified glycoprotein composition wherein the average molecular weight of the modified subunits are less than either the $\alpha'$, $\alpha$ or $\beta$ subunits of the glycoprotein precursor source material. The enzymatically modified 7S subunits of the aggregate from a 7S protein source material will, in general, have an average molecular weight of less than 50,000 and most typically less than the $\beta$ subunit glycoprotein precursor. As more fully illustrated by Example 1, the average molecular weight of the enzymatically modified subunits will normally fall within the 40,000–48,000 range and most typically within the 45,000–48,000 range.

The glycoprotein aggregates obtained from 7S soy protein precursors are typically comprised of six enzymatically modified subunits (average molecular weight of about 46,700) of an average molecular weight less than the β subunit (48,500 average molecular weight) as more fully shown by the Example 1 SDS polyacrylamide gel electrophoresis. The polarity of the glycoprotein subunit precursor is altered by the enzymatic modification as evidenced by the reduction in the migration values obtained from gel electrophoresis (pH 8.5 buffered 7M urea solution). The migration value (cm) for the enzymatically modified subunits under this test will typically be of a lesser value than the β subunits. This indicates the enzymatically modified subunits possess a lesser net negative charge than the β subunits. The polarity difference appears to affect the functionality of the aggregate in aqueous solution and especially its response towards saline solutions at various pH levels.

The compositional changes impart uniquely different physical and functional properties to the enzymatically modified aggregates. Vegetable glycoproteins are generally recognized as ineffective heat-gelling and gas entraining proteins. Rather specific conditions and limited recipes are required to form heat-set gels. The heat-set gels obtained from 7S glycoproteins are weak (e.g. easily penetrated and subject to deformation by compressive forces) and translucent. In contrast, the glycoprotein aggregates herein are easily converted into opaque, water-insoluble, solid gels upon heating to a temperature sufficient to heat-denature the glycoprotein aggregate.

The difference in heat-gelling properties become more pronounced in the presence of saline solutions. The heat-gelling properties of 7S precursors are affected by salts. The enzymatically modified aggregates possess heat-gelling properties over a broader saline solution and pH range than its precursor. Aqueous aggregate solutions containing 0.5 M added salt or higher at pH 5.75 can be thermally denatured into opaque gels. In the presence of 0.3 M added sodium chloride or less, the aggregates will typically heat-set into a solid opaque gel within 5 minutes at 85° C. and most typically within 3 minutes or less. The heat-setting characteristics as well as the appearance (e.g. white color) and textural properties (e.g. the firmness, mouthfeel, etc.) are similar to egg albumin. The firmness of the heat-set gels which contain less than 0.3 M added salt will generally be less than 5 mm (penetrometer determination) with those having a penetrometer valu of 3 mm being particularly well suited for use as an egg albumin or milk protein replacement.

The enzymatically modified aggregates provided under this invention have also been found to possess whip-stabilizing properties. The glycoprotein aggregates may be used to facilitate the ingestion of gas into foamed recipes and to prevent subsequent degassification or de-aeration of the foamed product. By employing the enzymatically modified aggregates as a whip-stabilizing agent in aqueous whipping compositions which contain vegetable proteins as the sole protein whipping agent, whipped products having a whip-stability at least comparable to egg albumin are provided by this invention.

The enzymatically modified vegetable glycoprotein compositions of this invention may be suitably prepared by a method comprising enzymatically treating an aqueous vegetable glycoprotein precursor solution with a proteinase to partially hydrolyze the glycoprotein into a glycoprotein aggregate composition characterized as being comprised of glycoprotein aggregates of an average molecular weight within the 200,000 to 300,000 molecular weight range in which the aggregates consist essentially of a plurality of glycoprotein subunits of an average molecular weight less than that of the glycoprotein subunit precursor source material for said enzymatically modified protein composition and an average electrophoretic migration value less than that of the subunit precursor source material for said composition, said composition being further characterized by forming a solid, opaque gel when a pH 5.75 aqueous solution which contains 15% composition (on a protein weight/volume basis), and 0.1 M sodium chloride is heated at 85° C. for 15 minutes.

Potential precursor source materials for the glycoprotein aggregates include proteins obtained from proteinaceous oil-bearing seed materials such as peanuts, cottonseeds, soybeans, sesame seeds, rape seed, safflower seeds, sunflower seed, mixtures thereof and the like. The 7S proteins obtained from leguminous oil-bearing seed sources, particularly defatted soy products are especially useful as a vegetable protein source material. Soybean meal, soy flour, soy grits, soy protein concentrates, isolates, mixtures thereof and the like are the preferred 7S vegetable protein source.

The foam stabilizing and heat-gelling efficacy of the enzymatically modified aggregate is concentration dependent. Consequently it is desirable to employ processing conditions which produce an enriched or concentrated enzymatically modified vegetable protein aggregate. Although the aggregate concentration may be increased at various processing stages (e.g. prior or after enzymatic treatment) by conventional isolation techniques (e.g. isoelectric pH, chromatographic, centrifugation, membrane, etc. separation techniques), it is advantageous to employ enriched 7S vegetable fractions as the precursor source material for the enzymatic modification. A variety of conventional 7S enrichment techniques may be used for this purpose. In general, it is advantageous that the enzymatically modified 7S comprise at least a major weight portion of the total vegetable protein weight. Further foam stabilizing or heat-gelling benefits may be obtained when at least 70% by weight (preferably at least 90%) of the total protein isolate weight comprises the enzymatically modified 7S vegetable protein fraction.

In the manufacture of vegetable protein isolates, the oils are typically first extracted from dehulled seed materials (e.g. grit or flake form) with a hydrocarbon solvent system such as hexane alone or sometimes in combination with a water-miscible organic solvent such as alcohol.

The enriched 7S fraction may be obtained by extracting the protein and carbohydrate water-solubles from the defatted seed materials, separating the solubles therefrom and recovering an enriched 7S fraction from the protein extract. The extraction conditions are suitably conducted so as to retain the 7S globulin substantially in its native form. The 7S component may be extracted at a pH between about 3.0 to about 9.0 without causing substantial hydrolysis or degradation of the 7S globulin.

The isoelectric pH for the 7S and 11S soy protein differs sufficiently to permit selective isolation or fractionation. The 11S fraction is insoluble in water at about pH 5.5 whereas the 7S fraction is least soluble at about a pH 4.4. Selective extraction of the 7S globulin may be effectively accomplished by adjusting the slurry containing 7S and 11S protein to a pH between about 5.0 to about 6.2 and preferably from about pH 5.4 to about pH 5.6. Under these extraction conditions, the water-soluble 2S, 7S and 9S fractions and carbohydrates are selectively extracted while the 11S protein remains substantially insoluble.

The most appropriate water to proteinaceous material slurry weight ratio for the extraction step depends upon the nature of the protein source material. In the case of soy proteins (e.g. soy grits, defatted soybean flakes, soy concentrates, soy isolates, etc.), the water to material weight ratio will typically range from about 8:1 to 20:1 or higher. Excessive solution viscosities appear to be the limiting factor at the higher solids level. The water to material weight ratio will most typically range from about 8:1 to less than 15:1 and advantageously at a weight ratio of about 9:1 to about 12:1.

The temperature of the extraction medium is maintained sufficiently low so as to alleviate permanent heat denaturization or degradation of the protein molecules, yet high enough to permit effective protein extraction. Extracting temperatures ranging from about 10° C. to 50° C. (or higher) under the appropriate extracting conditions may be utilized for this purpose. Extraction temperatures ranging between 25° C. to about 35° C. (preferably at about 30° C.) are particularly effective.

The presence of a small amount of a water-soluble salt of a sulfurous acid will significantly enhance the 7S yields. Such salts reduce the solution viscosity of the extracted protein. This permits the extraction to be conducted at a higher solids level. For most applications, the sulfurous ion concentration will range from about 0.01 mM to about 15 mM (preferably 0.5 mM–10 mM). Illustrative water-soluble salts of sulfurous acid which may be used include the alkali metal salt sulfites (e.g. potassium or sodium salts of sulfite, bisulfite, pyrosulfite, lithium sulfite) and other water-soluble producing salts of cations (e.g. ammonium sulfite, bisulfite, etc.), mixtures thereof and the like.

Substantially all of the insolubles are advantageously removed or separated from the extracted protein. Conventional clarifying techniques such as filtration or centrifugation may be used for this purpose.

Effective fractionation and isolation of the 7S and 11S proteins may also be accomplished by initially extracting both the 7S and 11S proteins at an alkaline pH in the presence of water-soluble salts, isoelectrically precipitating (e.g. pH 4.2–4.8) both the 7S and 11S, selectively extracting the 7S protein from the precipitate (preferably in the presence of sulfurous ion within the pH 5.0–5.8 range), separating the insoluble 11S from the enriched water-soluble 7S fraction and enzymatically modifying the enriched 7S fraction. Other fractionation techniques, such as disclosed by the Shemer patent or selective acid precipitation of the 11S protein (e.g. pH 5.8–6.3 in presence of salt and sulfurous ion) from the extract containing both 7S and 11S protein can also be used.

Conventional organic or mineral acids or bases may be used to adjust the slurry pH to selectively fractionate the 7S from an isolate precipitate or curd the protein from the extract. Lactic acid, citric acid and the like are illustrative organic acids while sulfurous, hydrochloric, sulfuric, phosphoric are illustrative mineral acids. Conventional proteinaceous curd removal techniques such as filtering, centrifugation, decantation, etc. may then be applied to separate the curded or precipitated protein from the uncurded protein and whey solubles. The curded protein isolate may then be washed and redissolved in water by conventional means to provide a substrate suitable for enzymatic modification.

The potency and effectiveness of the enzymatically modified 7S protein product is concentration dependent. This may be accomplished by initially enzymatically modifying an enriched 7S protein substrate or concentrating the modified 7S protein after the enzymatic treatment. Conventional 7S and 11S fractionation techniques (e.g. 7S optimum isoelectric pH 4.5 versus the optimum isoelectric pH 5.5 for the 11S) may be used to enrich the 7S content prior to its enzymatic treatment. Similarly, the isoelectric pH precipitation ranges differ sufficiently between the 7S digest and other proteins in the digest to permit its fractionation. For most applications, advantageously the digested 7S comprises at least a major weight portion and advantageously at least 70% by weight of the total vegetable protein isolate weight. Improved modified isolate functionality is obtained with vegetable protein isolate products containing more than 90% by weight of the enzyme modified 7S component and particularly those of at least 95% modified 7S content.

The enzymatic modification may be accomplished by treating the vegetable glycoprotein with a proteinase to cause a partial but incomplete digestion of the 7S component and to convert the 7S into the unique aggregates of this invention. The partial hydrolysis of the protein will typically reduce the average molecular weight of the 7S $\alpha'$ and $\alpha$ precursor (as determined by SDS polyacrylamide gel electrophoresis) by a factor of about 20%–60% with about 30% to 50% reduction being most typical. Acid proteinases identified within the 3.4.23 of *Enzyme Nomenclature,* (1972) include Pepsin A (3.4.23.1), Pepsin B (3.4.23.2), and Pepsin C (3.4.23.3), Chymosin (3.4.23.4), Cathepsin D (3.4.23.5), *Aspergillus* acid proteinase (3.4.23.6), Penicillium janthinellum acid proteinase (3.4.23.7), Yeast proteinase A (3.4.23.8), Rhizopus acid proteinase (3.4.23.9), Endothia acid proteinase (3.4.23.10), mixtures thereof and the like.

Pepsin has been found to be particularly effective. Enzymatic treatment with pepsin (1% of the protein d.s.b. weight at 1:10,000 unit activity) under digestive pH's of less than 1.3 at 43° C. for 10 hours results in excessive protein digestion, whereas altering the digestion within the pH 1.3 to about 6.0 range results in a partial digestion. Other proteinases capable of producing an equivalent effect to yield the unique aggregates of this invention may also be used to enzymatically treat the 7S component. Partial digestion of the 7S component with an effective amount of pepsin under conditions sufficient to reduce the $\alpha'$ or $\alpha$ subunit average molecular weight by a factor of about 25% to 50% (preferably a reduction within the 30–45% range) are generally applicable in providing the aggregate compositions of this invention.

In general, the digestive treatment will normally be conducted within a pH 1.3 to 3.5 range at a temperature of about 20° C. to about 70° C. and a protein concentration ranging from about 5% to about 20% for about 2 hours to about 1 day. For most commercial operations, the pepsin digestion will be conducted at about 35° C. to 45° C. at a pepsin (1:10,000 activity) concentration of about 0.1% to about 1% the protein weight (preferably between about 0.2 to about 0.5%) and about a 5% to 15% protein concentration for a digestion time of about 2 to about 10 hours at about pH 2.3–3.5.

Unlike most enzymatic processes which typically hydrolyze the protein to a hydrolyzate soluble in water (@20° C. and 10% by weight concentration) throughout the pH 3.0 to 6.0 range, the relatively mild enzymatic digestion herein retains a sufficient portion of the 7S globulin molecule intact to permit its recovery by precipitation such as by isoelectric pH adjustment and/or dilution. Typically the mild digestive treatment yields a 7S digest which may be recovered as a precipitate or curd by a pH adjusted within the pH 3.2 to 5.5 range and a water-soluble salt (e.g. sodium chloride) concentration of less than 0.15 M.

If desired, the 7S partial digest may be directly recovered in its liquid form for use as a foam stabilizing or heat-gelling protein or subjected to further processing. Recovery of 7S digest solids may be achieved by dehydrating the digest or by adjusting the digest pH to precipitate the 7S digest therefrom. The precipitated or curded 7S digest may then be separated from the digest by conventional recovery (e.g. filtration, centrifugation, etc.) or refining techniques (e.g. washing and reconstituting in water), and the dehydration thereof such as by drum-drying, freeze-drying, vacuum-drying, spray-drying, etc.

The enzymatic modification of the 7S globulins imparts uniquely different properties to the recovered isolate product. The foam stabilizing functionality renders the isolates useful for a wide variety of foaming applications. The ability to form heat-setting gels in the presence of salt concentrations heretofore believed to suppress or inhibit the gelation of commercial vegetable isolates offers unique adaptation to a wide variety of salt-containing recipes. When the isolate is properly formulated into salt-containing recipes, the heat-set gels closely simulate the textural characteristics of cooked egg albumins. The isolates of this invention may be used as a partial or complete egg protein replacement.

The enzymatically modified protein aggregate may be used in a wide variety of industrial, pharmaceutical, agricultural and food applications which rely upon binding, foam-stabilizing, heat-gelling, etc. additives.

EXAMPLE 1

A crude aqueous protein extract was prepared by initially slurrying 1 pbw medium Soy I grits[1] in 14 pbw water, (40° C. and adjusted to pH 8.0 with 25% NaOH) for one hour under low speed agitation. The spent grits were removed from the extract by centrifugation at 565×g using a 17" diameter perforated bowl head containing a canvas liner. The extract was processed through a Westfalia (Model SA-1) centrifuge to produce a clarified extract containing less than 0.2% suspended solids. The clarified extract contained 62.7% (N×6.25) of the I-grit protein.

[1]-Defatted (1.1% oil), 60 NSI, 53.6% protein soy "I" Grits (Medium size) manufactured and sold by the A. E. Staley Manufacturing Company, Decatur, Illinois The clarified extract was adjusted to pH 4.3 with 18% muriatic acid while continually stirring at a low speed. The isoelectrically precipitated curd was isolated by centrifugation at 565×g using a 17" solid bowl centrifuge.

Fifteen parts by weight of the isoelectric curd (d.s.b.) was dispersed in 85 parts by weight water. There was then added sodium bisulfite sufficient to yield a 7.5 mM bisulfite solution and sodium chloride to provide a 0.0 M solution. The slurry of the isoelectric precipitate was stirred for 30 minutes at 21.5° C. An enriched 7S fraction was obtained from the precipitate by adjusting the slurry to pH 5.3 with 25% sodium hydroxide and stirring the slurry under low speed agitation for one hour at 22° C. The enriched 7S soluble extract was then separated from the insoluble residue by centrifugation at 565×g using a 17" solid bowl centrifuge followed by clarification of the extract in a Westfalia (Model SA-1) centrifuge. The pH 5.3 extract contained 89.0% 7S and the remainder traces of whey proteins and 11S. The separated insoluble fraction contained (on a total protein basis) 70.5% 11S and 29.6% 7S.

The enriched pH 5.3 water-soluble 7S was then enzymatically modified by hydrolyzing with pepsin. The enzymatic modification was accomplished by adjusting the enriched 7S solution (6% dry solids concentration) to pH 2.3 with 18% HCl and adding one part by weight pepsin (Sigma Chem. Co., St. Louis, Mo. - 1:10,000 activity) for each 99 parts by weight (d.s.b.) protein solids. The 7S digestion was conducted for 4 hours at 43° C. The modified 7S protein was then isolated from the digest by a pH 4.35 adjustment and diluting the digest (1 part) with water (3 parts), which causes the enzymatically modified 7S protein (EMP) to precipitate therefrom. The insoluble, enzymatically modified 7S digestive product was then separated from the digest by centrifugation (565×g). The insoluble fraction was then dissolved in water (at 15% dry solids concentration), adjusted to a pH 5.6 with a neutralizing base (25% aqueous sodium hydroxide) and spray-dried.

The average molecular weight for the enzymatically modified 7S product was determined by Gel Filtration Chromatography. Determination of the $\alpha'$, $\alpha$ and $\beta$ subunits of the 7S precursor and the enzymatically modified subunit were by SDS polyacrylamide gel electrophoresis. Electrophoretic migrating values for the $\beta, \alpha'$ and $\alpha$ and enzymatically modified subunits were determined by polyacrylamide gel electrophoresis at pH 8.5 and 7 M urea. The specific test methods for making these determinations are as follows:

SDS POLYACRYLAMIDE GEL ELECTROPHORESIS

The SDS polyacrylamide gel electrophoresis was performed as described by Laemnli V. K., *Nature* (London) 227 (1970) 680-685, with a vertical slab cell (Bio-Rad Laboratories, Richmond, Ca., Model 220) and D.C. power supply (LKB, Bromma, Sweden, Model 2103). The separating and stacking gels were respectively 9% or 10.5% and 4.5% acrylamide. Soy protein samples and standards were solubilized in 0.0625 M Tris-HCl buffer, pH 6.8 containing 1.0% w/v SDS, 10% w/v glycerol, 2% w/v 2-mercaptoethanol and heated for 5 minutes at 100° C. The gels (2) were run for 1.5 hr. at 30 mA followed by 1.5-2 hr. at 80 mA. Molecular weight calibration protein standards were obtained from Pharmacea Fine Chemicals (Piscataway, N.J., LMW kit). The molecular weight of the protein subunits was determined from a plot of the Log. molecular weight versus the electrophoretic mobility in cm.

GEL ELECTROPHORESIS (pH 8.5-7 M Urea)

Polyacrylamide slab gel electrophoresis was performed at pH 8.5 using the discontinuous voltage gradient system (Tris-Cl/Tri-glycine) as described by Maurerer, H. R. and Allen, R. C. (Z. klin, Chem. u. klin. Biochem., 10 Jg (1972) S. 220–225, gel system #3) with the incorporation of 7 M urea in the separating gel. The acrylamide concentration for the separating, well-forming and cap gels was 7%, 8% and 8% respectively. Electrophoresis was preformed at 25 mA for 3.5 hours (Bromophenol blue migration, 8.5 cm) using the slab gel apparatus previously described. Protein samples were dissolved and equilibrated in 0.075 M Tris-Cl buffer, pH 8.5 containing 7 M urea prior to electrophoresis.

GEL STAINING PROCEDURES

The proteins were stained (Wang, K., *Biochem.* 16 (1977) 1857–1865) in 0.1% w/v Coomassie Blue R-250 in 2-propanol-acetic acid-water, 25-10-65, V/V/V. Destaining was performed in a slab diffusion destainer (Bio-Rad Laboratories, Richmond, Ca., Model 222) in 2-propanol-acetic acid-water, 10-10-80, V/V/V. The destained gels were scanned using a densitometer (E-C Apparatus Corp., Model EC-910) and dual channel, integrating OmniScribe® recorder (Houson Instruments, Austin, Texas, Model 5000).

The percent distribution of the soy proteins is calculated by sum of the areas of the individual subunit species representing the 7S or 11S soy protein aggregates divided by the total area of scan times 100 as determined by the following equations:

$$\% \ 7S \ \text{protein} = \frac{\alpha' + \alpha + \beta}{\text{Total area of Scan}} \times 100 \qquad \text{I.}$$

$$\% \ 11S \ \text{protein} = \frac{A \ Sub. + B \ Sub.}{\text{Total area of Scan}} \times 100 \qquad \text{II.}$$

wherein $\alpha'$, $\alpha$ and $\beta$ represent the major subunit species area of the 7S globulin as defined by Thanh et al.; and the A Sub. and B Sub. respectively represent the acidic and basic subunit areas of the 11S globulin as defined by Catsimpoolas et al.

Glycoproteins were stained by the Periodic Acid-Schiff technique (Zacharius et al., *Anal. Biochem.* 30 (1969) 148–152). The fuchsin-sulfite stain solution was prepared as described by McGuckin, W. F. and McKenzie, B. F. (*Clinical Chem.* 4 (1958) 476–483).

GEL FILTRATION CHROMATOGRAPHY

Gel filtration chromatography was performed on a 1.3 cm I.D.×91 cm column containing Bio-Gel A-5 m. 100/200 mesh resin (Bio-Rad Laboratories, Richmond, Ca., Lot 178672). The elution buffer contained 0.4 M NaCl, 0.1 M Tris-Cl(Tris[hydroxymethyl]amine methane) and 0.02% NaN$_3$. pH 7.6. A flow rate of 9.75 ml/hr. was maintained with a parastaltic pump (Pharmacea Fine Chemicals, Bromma, Sweden, Model P-3, 2 mm I.D. tubing). The elution was monitored at 254 nM (LKB Instruments Inc., Rockville, Maryland, Type 4701A) and 1 ml. fractions were collected (LKB Instruments Inc., Model 7000 Ultrorac®). Individual fractions were assayed for proteins (Bradford, M. M., *Anal. Biochem.*, 72 (1976) 248–254) and their absorbance at 280 mM (Beckman Instruments, Inc., Fullerton, Ca. Acta II® spectrophotometer).

The column was calibrated with proteins of known molecular weight thereby allowing the molecular weight of sample proteins to be evaluated (Andrews, P., *Biochem. J.*, 96 (1965) 595–606). Standard proteins included Apoferritin (Calibiochem., San Diego, Ca., horse spleen, Lot 601535), Aldolase (Pharmacea Fine Chem., Lot DN-11), Conalbumin (Sigma Chem. Co., chicken egg white, Lot 46C-8125), Ovalbumin (Sigma Chem. Co., Lot 18C-8035-1), Cytochrome C (Sigma Chem., Co., horse heart, Lot 48C-7370) and sucrose. The void volume was determined with Dextran 2000 (Pharmacea Fine Chem.).

ION EXCHANGE CHROMATOGRAPHY

The 7S and 11S soy globulins were isolated as described by Thanh, V. H. and Shibasaki, K., *J. Agri. Food Chem.* 24 (1976)1117–1121, and were used as soy protein standards. The 7S soy globulins were further purified by affinity chromatography on Con A-Sepharose® 4B (Pharmacea Fine Chemicals, Piscataway, N.J., Lot D1-8972) as described by Kitamura et al., (*Agri. Biol. Chem.* 38 (1974) 1083–1085). The $\alpha'$, $\alpha$ and $\beta$ subunits of the 7S soy globulins were separated and isolated by ion exchange chromatography on a 1.3 cm I.D.×26 cm column of DEAE Bio Gel A® (Bio-Rad Laboratories, Richmond, Ca.) as described by Thanh, V. H. and Shibasaki, K., (*Biochem. Biophys. Acta.*, 490 (1977) 370–383). The column and samples were equilibrated with 0.05 M Tris-Cl buffer, pH 8.0 containing 6 M urea. Proteins which were retained by the column, after extensive washing with equilibration buffer, were eluted with a linear NaCl gradient from 0 to 0.5 M prepared in 0.05 M Tris-Cl, 6 M urea, pH 8.0.

The average molecular weight for the EMP aggregates was 265,000 as determined by gel filtration chromatography. The average molecular weight of the EMP subunit was 46,700 as determined by SDS polyacrylamide gel electrophoresis. Thus, the EMP aggregate is likely to be composed of six such protein subunits. The SDS gel electrophoresis of the enriched 7S extract revealed that the precursor contained the $\alpha'$, $\alpha$ and $\beta$ subunits of 7S as well as acid and basic subunits of 11S which were respectively determined to have an average molecular weight of 79,500; 72,000; 48,500; 35,500 and 22,200. None of the native 7S subunit precursors or 11S subunits were detected by SDS polyacrylamide gel electrophoresis in the enzyme modified product. Enzyme modification of the 11S soy globulins under identical conditions does not result in EMP production. The average molecular weight for the EMP subunit (i.e. 46,700) is slightly less than $\beta$ subunit average molecular weight (i.e. 48,500) but distinguishable therefrom on the basis of the SDS gel electrophoresis.

The pH 8.5 and 7.0 M urea electrophoretic studies revealed that all the subunits of 7S precursors possessed a greater net negative charge than the EMP subunit. The respective migration values (in cm) for the subunits of the EMP, the $\beta$ and $\alpha'$ and $\beta$ and bromphonol blue were 0.9 cm, 1.5 cm, 2.2 cm and 9.0 cm. These results were supported by the behavior of the EMP product when subjected to ion exchange chromatography at pH 8.0 in 6 M urea. The EMP product subunits were not retarded by the resin and eluted with the buffer breakthrough volume. The native 7S subunits were bound to the resin and required elution with a NaCl gradient. The elution order of the subunits was $\beta$, $\alpha'$ and $\alpha$ at a respective NaCl concentration of 0.05, 0.075 and 0.1 M.

The glycoprotein nature of the EMP product subunits was indicated by a positive staining reaction with the Periodic Acid-Schiff technique after SDS polyacrylamide gel electrophoresis. The 7S soy globulin subunits also gave a positive reaction while a negative reaction was observed for the 11S soy globulin subunits.

The aforementioned test data indicates that the enzymatically modified 7S proteins are characterized as being glycoprotein aggregates having an average molecular weight of approximately 265,000 in which the aggregate is comprised of six subunits having an average molecular weight of approximately 46,700. The enzymatic modifications appear to partially hydrolyze the terminal portions of the 7S subunits. This results in a reduction in the subunit molecular weight, a change in the charge to mass ratio and restructuring of the subunits into a glycoprotein aggregate possessing unique compositional and functional properties.

EXAMPLE 2

This example comparatively illustrates the whip stabilizing effects of unmodified 7S protein, EMP and egg albumin in whipped products. The comparative tests were designed to measure the effectiveness of the proteins in preventing de-aeration of a whipped product over a 24-hour test interval.

In each test, 12.65 grams whipping agent (as identified in Table 1) was employed except that 15 grams was used in the egg albumin test. The whipping recipe comprised preparing a hot syrup which was mechanically folded into a whipped protein portion. The hot syrup was prepared by heating 605 g. of granulated sugar, 302 g. of 42 D.E. syrup and 100 ml. water to 115° C. in a copper cooking vessel.

The whipped protein portion was separately prepared by adding granulated sugar (605 g.), a 42 D.E. corn syrup[2] (302 g.) to a 10-quart bowl of Hobart C-100 mixer. An aqueous protein solution (65 ml. water) containing the whipping agent and the protein whip stabilizing agent (at the designated Table 1 levels) was then mechanically folded into the mixing bowl containing the 42 D.E. corn syrup. The bowl contents were mixed at a low speed for 2 minutes; the mixing bowl was then lowered and the contents adhering to the bowl were scraped into the contents, mixed at low speed for an additional 2 minutes, followed by a 9-minute medium speed mix and an 8-minute high speed whip. The hot syrup preparation was conducted so that it was heated to 115° C. at approximately the same time as the whipped protein portion preparation was completed. The 115° C. cooked syrup was then mechanically folded into the whipped protein portion (about one minute at a low speed) and the finished recipe was whipped for an additional 2 minutes at a medium speed. The aerated product was allowed to stand for 2 minutes.

[2]Staley 1300, a 42 D.E., 80.3% solids (d.s.b.) corn syrup containing on a weight basis 20% dextrose, 14% disaccharide, 12% trisaccharide, 54% D.P. 4 saccharides and higher—manufactured and distributed by A. E. Staley Manufacturing Company, Decatur, Illinois After leveling the surface of the whipped product with a spatula, foam densities were obtained by carefully filling tarred containers of a known volume with the whipping product, striking off the surface excess with a spatula, weighing the tarred container and its contents and determining the density for each of the test samples. The remaining portion of each whipped product was poured into a 4-quart container, covered to reduce moisture loss and retained. The density of the aerated mix was determined after 24 hours and the difference between the initial density and the 24-hour density was recorded as the 24-hour weight gain. Table 1 reports the results of this study.

TABLE 1

Whip Stability Results

| Whipping Agent | Protein Additive (grams) | Initial Density (g/ml) | 24 Hr. Density (g/ml) | 24 Hr. Gain (g/ml) | Rating of Whipped | Physical Appearance |
|---|---|---|---|---|---|---|
| Soy protein[3] | None | 0.578 | 0.675 | 0.093 | 1.0 | Stringy, poor flow, uneven aeration, heavy surface fold |
| Soy protein[3] | EMP (1.0) | 0.547 | 0.628 | 0.081 | 1.5 | Stringy, uneven aeration, light surface fold |
| Soy protein[3] | EMP (1.5) | 0.571 | 0.649 | 0.078 | 2.5 | Stringy, uneven aeration, heavy surface fold |
| Soy protein[3] | EMP (2.0) | 0.584 | 0.635 | 0.051 | 3.0 | Slightly stringy, better spring, surface bubbles, good aeration |
| Soy protein[3] | EMP (2.5) | 0.565 | 0.607 | 0.043 | 4.0 | Not stringy, good color, excellent aeration and uniformity, stiff peaks, good spring |
| Soy protein[3] | EMP (3.0) | 0.571 | 0.621 | 0.050 | 4.0 | Not stringy, good color, excellent aeration and uniformity, stiff peaks, good spring |
| Soy protein[3] | 7S (1.0) | 0.564 | 0.643 | 0.079 | 1.0 | Medium surface fold, stringy, poor spring, uneven aeration |
| Soy protein[3] | 7S (1.5) | 0.579 | 0.674 | 0.095 | 1.0 | Stringy, light surface fold, uneven aeration |
| Soy protein[3] | 7S (2.0) | 0.574 | 0.647 | 0.073 | 1.5 | Light surface fold, stringy, better spring |
| Soy protein[3] | 7S (2.5) | 0.579 | 0.655 | 0.076 | 1.5 | Light surface fold, stringy, better spring |
| Egg albumin | None | 0.677 | 0.733 | 0.056 | 4.0 | Not stringy, good color, excellent aeration and uniformity, stiff peaks, good spring |

[3]Gunther D-100WA, an enzymatically modified soy protein whipping agent manufactured and distributed by the A. E. Staley Manufacturing Company

EXAMPLE 3

This Example compares the heat-gelling characteristics of EMP (Example 1) at various salt concentrations with the non-enzymatically treated 7S fraction of Example 1. For each test sample, an equivalent protein amount (15% protein on a 6.25×N weight/volume basis) was dissolved in 60 grams of dionized water containing the added sodium chloride molar concentrations as designated in Table 2. The test samples were all adjusted to pH 5.75 with 18% hydrochloric acid. Salt residues are inherently present in all isolates and cannot be effectively removed without causing substantial alterations to glycoprotein structure and its functionality. Accordingly, the heat-gelling studies were based upon the molarity of saline test solution (i.e. added salt) without taking into account the salt content of the glycoproteins.

The tests were conducted by pouring 7 ml. test solution aliquots into a 18×150 mm test tube and heating the test samples in an 85° C. water bath for a maximum time interval of 15 minutes.

The heat-gelling times were based upon the time interval required to convert the liquid test solutions (throughout the test tube) into a uniformly solidified and colored heat-set gel.

The heat-set gels for the penetrometer study were prepared under identical test conditions as the heat-gelling time study except that the test solution samples were held for 5 minutes after their preparation, heated in a water bath for 15 minutes and then ambiently cooled (22° C.) for one hour before testing upon a Precision Scientific penetometer equipped with a 38.35 gram probe. The penetrating portion of the probe consisted of a 6 mm. hemisphere.

The protein gelling agents, salt concentrations, gelation times and penetrometer values obtained from these studies are reported in Table II.

TABLE II

| Protein Gelling Agent | Salt Concentration (moles) | Gelation Time (Min.) | Penetrometer Values (mm) |
|---|---|---|---|
| Enzymatically modified protein | 0.0 | 2.2 | 1.1 |
| Enzymatically modified protein | 0.025 | 2.0 | 1.9 |
| Enzymatically modified protein | 0.05 | 2.0 | 0.8 |
| Enzymatically modified protein | 0.075 | 2.0 | 1.3 |
| Enzymatically modified protein | 0.1 | 2.6 | 3.6 |
| Enzymatically modified protein | 0.2 | 2.25 | 3.0 |
| Enzymatically modified protein | 0.3 | 4.25 | 2.7 |
| Enzymatically modified protein | 0.4 | 10.0 | 11.4 |
| Enzymatically modified protein | 0.5 | 14.7 | 20.8 |
| Unmodified 7S soy protein | 0.0 | fluid | — |
| Unmodified 7S soy protein | 0.025 | fluid | — |
| Unmodified 7S soy protein | 0.075 | fluid | — |
| Unmodified 7S soy protein | 0.1 | fluid | — |
| Unmodified 7S soy protein | 0.2 | viscous fluid | — |
| Unmodified 7S soy protein | 0.3 | 10.25 | 26.6 |
| Unmodified 7S soy protein | 0.4 | 12.17 | 24.4 |
| Unmodified 7S soy protein | 0.5 | fluid | — |

As illustrated by the Table II data, all the tested EMP solutions formed heat-set gels within the 15-minute test interval. Only two of the unmodified 7S isolates were capable of forming heat-set gels. The unmodified 7S gels were soft and translucent gels, similar in rheological and textural properties to those which are obtained from traditional gelation. In contrast, all the EMP solutions formed white, opaque gels. All the EMP gels were more resistant to probe penetration than the two 7S gels. The EMP gels were similar in appearance and character to boiled egg albumin.

The EMP gels from saline solutions containing 0.4–0.5 M sodium chloride were less firm than those of a lesser salt content. The heat-setting characteristics of the 0.4 M and 0.5 M EMP solutions were layered similar to that of curdled milk whereas those formulated with aqueous solution containing from 0–0.3 M sodium chloride formed heat-set gels similar to egg albumin.

The aforementioned comparative tests show that the enzymatic 7S treatment alters the physical and functional properties of the 7S fraction.

EXAMPLE 4

Comparative solubility tests were also conducted upon the test solutions, containing either the 7S precursor or the enzymatically modified 7S protein, which were adjusted to a pH 3.0, 3.5, 4.0, 4.5, 5.0, 5.5 and 6.0 at various salt concentrations. Significant solubility differences were observed between the unmodified 7S isolate and modified 7S isolate at pH 5.5 and pH 3.0 as shown below.

| | Unmodified 7S | | Enzymatically Modified 7S | |
|---|---|---|---|---|
| NaCl | pH 3.0 | pH 5.5 | pH 3.0 | pH 5.5 |
| 0.0M | 98% | 75% | 57.5% | 48% |
| 0.05M | 82% | 74.5% | 51.5% | 52.5% |
| 0.1M | 87.5% | 68.5% | 60.5% | 59.7% |
| 0.15M | — | — | 76.2% | 66.5% |
| 0.2M | 85.5% | 80.5% | 79.7% | 81% |
| 0.5M | 82.2% | 83.5% | 82.7% | 77% |

As shown above, EMP becomes more soluble with salt concentration increases at a pH 3.0 and pH 5.5. In contrast, salt generally decreases the unmodified 7S solubility at the pH 3.0 and 5.5 levels. The enzymatic modification of the 7S subunits apparently contributes to these differences. Although not reported above, a significantly greater rate of increase for the EMP solubility (relatively insoluble to soluble) occurred between the 0.1 M and 0.2 M salt concentrations at the pH 3.5, pH 4.0, pH 4.5 and pH 5.0 levels than was observed with respect to the 7S isolate precursor.

The aforementioned solubility tests were obtained by adjusting the test solution to the appropriate pH level, adding sufficient deionized water to provide total solution volume of 10 ml. (3.12 mg/ml. on protein basis), centrifugating at 565×g to separate the solubles from insolubles and ascertaining the percent soluble protein by the colorimetric method of Bradford, M. M. (Anal. Biochem., 72 (1976) 248-254).

EXAMPLE 5

This Example illustrates that the EMP can be effectively used to simulate the appearance, color, flavor and textural properties of a natural fried egg in an imitation egg recipe.

The following ingredients were used to prepare the imitation eggs:

| Imitation Yolk Solution Recipe (parts by weight basis) | |
|---|---|
| 81 | water |
| 15 | EMP of Example 1 |
| 2 | Gelatin - 225 bloom |
| 2 | $CaCl_2.2H_2O$ |
| | Coloring - (#8038 Bakers' egg shade) |
| | Egg yolk flavoring |
| 100 | |

| Egg White Solution (parts by weight) | |
|---|---|
| 15 | EMP of Example 1 |
| 2.0 | Salt |
| 0.3 | Sodium alginate (MS 120 Mallinckrodt) |
| 0.3% | Carboxymethylcellulose (7H35F - Hercules, Wilmington, Del.) |
| | Egg white flavoring agent |
| 82.4% | Water |
| 100 | |

The imitation fried egg recipe comprising heating the yolk solution to 120° C. and pouring it into a plastic mold of a fried egg yolk shape, cooling the yolk to 40° F., removing the yolk from the mold, placing the molded yolk in a 1% sodium alginate solution for a period of time to permit the sodium alginate to form an encapsulating coating upon the surface of the molded egg yolk, placing the encapsulated yolk in a frying pan containing 40 ml. of the imitation white solution and frying for two minutes to provide an imitation fried egg which simulates the flavor, color and textural characteristics of a sunny-side-up, fried egg.

What is claimed is:

1. An enzymatically modified vegetable protein composition possessing improved heat-gelling properties, prepared from 7S glycoproteins which contains (on a total protein weight basis), enzymatically modified 7S glycoprotein as the major protein component of the composition, said composition comprising enzymatically modified 7S protein in which the glycoprotein aggregates have an average molecular weight within the 200,000 to 300,000 molecular weight range, said glycoprotein aggregates consist essentially of a plurality of glycoprotein subunits of an average molecular weight of less than the glycoprotein subunit precursor source material for said enzymatically modified protein composition and the average electrophoretic migration value for the enzymatically modified subunits is less than that of the 7S glycoprotein subunits precursor source material for said composition, said composition being further characterized by forming a solid, opaque gel when an aqueous solution adjusted to 0.1 M sodium chloride concentration and pH 5.75 and containing 15 protein grams of said composition for each 100 ml of water is heated at 85° C. for 15 minutes.

2. The composition according to claim 1 wherein the glycoprotein source material consists essentially of 7S glycoproteins of soy proteins.

3. The composition according to claim 2 wherein the aggregate consists essentially of six glycoprotein subunits of an average molecular weight less than 48,000.

4. The composition according to claim 2 wherein the enzymatically modified composition comprises an acid proteinase modified 7S glycoprotein.

5. The composition according to claim 2 wherein the electrophoretic migrating value of the enzymatically modified subunit has a value of about 25% to about 50% of the migrating value for the α' and α precursor subunits.

6. The composition according to claim 3 wherein the aqueous solution thereof is characterized as heat-setting into a white, heat-set gel of a penetrometer value of less than 5 when heated at 85° C. for 15 minutes.

7. The composition according to claim 6 wherein the gel obtained from the glycoprotein aggregate composition is characterized as having a penetrometer value of less than 3 mm.

8. The composition according to claim 6 wherein the aqueous solution containing the glycoprotein aggregate composition is characterized as heat-setting into a heat-set gel within five minutes.

9. The composition according to claim 3 wherein the glycoprotein aggregate composition is characeized as having an average molecular weight of about 265,000 and the subunits have an average molecular weight of about 47,000.

10. The composition according to claim 9 wherein the composition consists essentially of pepsin modified glycoprotein aggregate and the electrophoretic migrating value for the pepsin modified subunits range from about 35% to 45% of the migrating value for the α' and α subunit precursor of said aggregate composition.

11. The composition according to claim 3 wherein the glycoprotein aggregate composition is characterized as having an average molecular weight within the 250,000 to 280,000 M.W. range, and heat-setting into a white, opaque, gel when the aqueous solution thereof is heated at 85° C. for 5 minutes.

12. A method for providing a heat-gelling, enzymatically modified vegetable glycoprotein composition containing (on a weight basis) 7S glycoprotein as the major protein component of said composition, said method comprising enzymatically treating an aqueous vegetable solution which on a total protein weight basis contains 7S glycoprotein as the major vegetable protein component with proteinase to partially hydrolyze the glycoprotein into glycoprotein aggregates of an average molecular weight within the 200,000 to 300,000 molecular weight range in which the glycoprotein aggregates consisting essentially of a plurality of enzymatically modified glycoprotein subunits of an average molecular weight less than that of the unhydrolyzed glycoprotein subunit precursor source material for said enzymatically modified protein composition and, the enzymatically modified glycoprotein subunits are characterized as having an average electrophoretic migration value less than that of the unhydrolyzed subunits precursor source material for said composition, and said composition is being further characterized as forming a solid, opaque gel when an aqueous solution adjusted to 0.1 M sodium chloride concentration and pH 5.75 and containing 15 protein grams of said composition for each 100 ml of water is heated at 85° C. for 15 minutes.

13. The method according to claim 12 wherein the source material consists essentially of soy protein.

14. The method according to claim 12 wherein the soy protein comprises an enriched 7S fraction containing (on a weight basis) at least 70% by weight of the enzymatically modified 7S glycoprotein.

15. The method according to claim 14 wherein the 7S glycoprotein is hydrolyzed with an acid proteinase for a period of time sufficient and under hydrolyzing conditions to provide a glycoprotein aggregate of an average molecular weight within the 250,000 to 280,000 M.W. range and the glycoprotein aggregate consisting essentially of six subunits in which the subunit average molecular weight is greater than 40,000 but less than 50,000.

16. The method according to claim 15 wherein the 7S glycoprotein is hydrolyzed with an acid proteinase.

17. The method according to claim 14 wherein the 7S glycoprotein is hydrolyzed with an effective amount of a proteinase under conditions sufficient to provide a glycoprotein aggregate composition characterized as having an average molecular weight within the 250,000 to 280,000 range and the aggregate composition consists essentially of six glycoprotein subunits.

18. The method according to claim 17 wherein the hydrolysis of the 7S glycoprotein provides an aggregate composition which upon dissolution in water containing 0.1 M sodium chloride at pH 5.75 and 15% aggregate composition concentration (protein dry solids weight/water volume basis) and heating at 85° C. for 5 minutes will provide a white, solid, opaque heat-set gel.

19. The method according to claim 17 wherein the hydrolysis provides an aggregate composition characterized as having a migrating value ranging from about 25% to about 60% of the migrating value for the α' and α subunit precursors of said aggregate composition.

20. The method according to claim 17 wherein the aggregate composition is characterized as having an average molecular weight of about 265,000 and the average subunit molecular weight is about 47,000.

21. In a method for preparing a heat-set gel from an aqueous solution containing a protein as a heat-gelling agent, the improvement which comprises replacing at least a portion of the heat-gelling protein agent with an enzymatically modified vegetable protein composition comprised of enzymatically modified 7S glycoprotein aggregates as the major vegetable protein component (total vegetable protein weight basis) of said composition, said aggregates being characterized as having an average molecular weight within the 200,000 to 300,000 molecular weight range with the aggregates consisting essentially of a plurality of glycoprotein subunits of an average molecular weight less than the glycoprotein subunits precursor source material for said enzymatically modified glycoprotein composition and the enzymatically modified subunits have an average electrophoretic migration value less than that of the non-enzymatically modified subunit precursor source material for said composition, and said composition is further characterized as forming a solid, opaque gel when an aqueous solution adjusted to 0.1 M sodium chloride concentration and pH 5.75 and containing 15 protein grams of said composition for each 100 ml of solution is heated at 85° C. for 15 minutes.

22. The method according to claim 21 wherein the enzymatically modified glycoprotein consists essentially of enzymatically modified 7S soy protein.

23. The method according to claim 22 wherein the composition is characterized as heat-setting within 5 minutes into a solid, opaque gel when the aqueous solution is heated at 85° C.

24. The method according to claim 22 wherein the aggregate composition is characterized as having an average molecular weight of about 250,000 to about 280,000 and the glycoprotein aggregate consists essentially of six subunits in which the average molecular weight for the individual subunits of said aggregate ranges from about 40,000 to 50,000 M.W.

25. The method according to claim 24 wherein the composition is characterized as forming a solid, white, heat-set gel of a penetrometer value less than 5 mm when heated at 85° C. for 15 minutes.

26. A heat-set gel containing the aggregate composition of claim 21.

27. A heat-set gel containing the aggregate composition of claim 22.

28. A heat-set gel containing the aggregate composition of claim 23.

29. A heat-set gel containing the aggregate composition of claim 24.

30. A heat-set gel containing the aggregate composition of claim 25.

31. In a method for preparing foamed product from an aqueous foaming composition containing a hydrophilic foaming agent wherein gas is ingested into the foaming composition to provide a foamed product, the improvement which comprises incorporating an effective amount of an enzymatically modified glycoprotein 7S aggregate composition into the foaming composition to stabilize the foamed product against degasification, said 7S glycoprotein aggregate composition being characterized as comprising an enriched 7S vegetable protein isolate wherein the 7S glycoprotein aggregates have an average molecular weight within the 200,000 to 300,000 molecular weight range, the aggregates of the enzymatically modified protein consisting essentially of a plurality of glycoprotein subunits of an average molecular weight less than that of the unmodified glycoprotein subunit source material for said enzymatically modified glycoprotein composition and the enzymatically modified subunits have an average electrophoretic migration value less than that of the unmodified glycoprotein subunits, and the aggregate composition is further characterized as providing a solid, opaque gel when an aqueous solution adjusted to 0.1 M sodium chloride concentration and pH 5.75 and containing 15 protein grams of said aggregrate composition for each 100 ml of water is heated at 85° C. for 15 minutes.

32. The method according to claim 31 wherein the enzymatically modified glycoprotein consists essentially of enzymatically modified 7S soy protein.

33. The method according to claim 32 wherein at least a major weight portion of the hydrophilic foaming agent of said foaming composition comprises a vegetable protein whipping agent.

34. The method according to claim 32 wherein the aggregate composition is characterized as having an average molecular weight of about 250,000 to about 280,000 and the glycoprotein aggregate consists essentially of six subunits in which the average molecular weight for the individual subunits of said aggregate ranges from about 40,000 to 50,000 M.W.

35. The method according to claim 34 wherein the glycoprotein is enzymatically modified with an acid proteinase to provide an aggregate composition which upon dissolution in 100 ml water of 0.1 M sodium chloride concentration at pH 5.75 and heating at 85° C. for 5 minutes will provide a white, solid, opaque heat-set gel.

36. The method according to claim 34 wherein the hydrophilic foaming agent consists essentially of a vegetable protein whipping agent.

37. The method according to claim 32 wherein the aggregate composition is characterized as having an average molecular weight of about 265,000 and the average subunit molecular weight is about 47,000.

38. The foamed product of claim 32.
39. The foamed product of claim 33.
40. The foamed product of claim 35.
41. The foamed product of claim 36.
42. The foamed product of claim 37.

* * * * *